United States Patent
Sanz et al.

(10) Patent No.: US 10,681,155 B1
(45) Date of Patent: Jun. 9, 2020

(54) PRESENTING USER ACTIVITY TIMELINE IN A COLLOQUIAL STYLE

(71) Applicant: GOOGLE LLC, Mountain View, CA (US)

(72) Inventors: Gerard Sanz, Zurich (CH); Markus Cedric Huebscher, Adliswil (CH); Jana McSorley, Zurich (CH); John Maguire, Zurich (CH); Dino Wernli, Zurich (CH); Selen Basol, Zurich (CH); Johannes Gerardus Maria, Birmensdorf (CH); Dorington George Little, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 470 days.

(21) Appl. No.: 14/993,892

(22) Filed: Jan. 12, 2016

Related U.S. Application Data (60) Provisional application No. 62/102,997, filed on Jan. 13, 2015.

(51) Int. Cl.
| | |
|---|---|
| *H04L 29/08* | (2006.01) |
| *G06F 3/0484* | (2013.01) |
| *G06F 16/29* | (2019.01) |
| *G06F 16/955* | (2019.01) |

(52) U.S. Cl.
CPC ............ *H04L 67/18* (2013.01); *G06F 3/0484* (2013.01); *G06F 16/29* (2019.01); *G06F 16/955* (2019.01); *H04L 67/22* (2013.01)

(58) Field of Classification Search
CPC ..... G06Q 10/06311; G06Q 10/063114; G06Q 10/06314
See application file for complete search history.

(56) References Cited

U.S. PATENT DOCUMENTS

| | | | |
|---|---|---|---|
| 5,745,110 A * | 4/1998 | Ertemalp | G06F 17/211 345/440 |
| 7,313,755 B2 | 12/2007 | Rahman et al. | |
| 7,376,909 B1 * | 5/2008 | Coyle | G06Q 10/109 715/778 |
| 7,934,159 B1 | 4/2011 | Rahman et al. | |

(Continued)

OTHER PUBLICATIONS

CNET, "Bing Versus Google Maps: Voice Navigation Compared," (2010). Retrieved from the Internet on May 24, 2013: URL:http://download.cnet.com/8301-2007_4-20005154-12.html.

(Continued)

*Primary Examiner* — Ryan F Pitaro
(74) *Attorney, Agent, or Firm* — Marshall, Gerstein & Borun LLP (57) ABSTRACT

To generating a presentation of user activities occurring over a period of time, location history data that indicates multiple locations a user visited, along with the respective visit times, is received from the user. Using the location history data, a continuous event that begins on a first calendar day and ends on a second calendar day is determined. A representation of the first calendar day as a colloquial day is generated, where the colloquial day includes the entire event, and where the colloquial day at least partially overlaps with the calendar day but does no coincide with the calendar day. The colloquial day is displayed via a user interface.

19 Claims, 8 Drawing Sheets

(56) References Cited

U.S. PATENT DOCUMENTS

| | | | |
|---|---|---|---|
| 8,327,272 B2* | 12/2012 | Anzures | G06F 1/1626 |
| | | | 715/731 |
| 8,606,497 B2 | 12/2013 | Doherty et al. | |
| 9,848,802 B2* | 12/2017 | Eastman | A61B 5/1118 |
| 10,058,279 B2* | 8/2018 | Emori | G06Q 50/22 |
| 2005/0094494 A1* | 5/2005 | Parees | G06Q 10/109 |
| | | | 368/29 |
| 2006/0153545 A1* | 7/2006 | Agata | G11B 27/034 |
| | | | 386/232 |
| 2007/0282930 A1* | 12/2007 | Doss | G09B 19/00 |
| | | | 708/111 |
| 2007/0297582 A1* | 12/2007 | Tuli | H04M 15/00 |
| | | | 379/111 |
| 2008/0120330 A1 | 5/2008 | Reed et al. | |
| 2008/0207274 A1* | 8/2008 | Kim | H04M 1/72544 |
| | | | 455/566 |
| 2008/0294663 A1 | 11/2008 | Heinley et al. | |
| 2009/0083644 A1* | 3/2009 | Kimura | G06Q 10/109 |
| | | | 715/764 |
| 2009/0164910 A1* | 6/2009 | Laakso | G06Q 10/109 |
| | | | 715/748 |
| 2009/0172035 A1* | 7/2009 | Lessing | G06F 17/30595 |
| 2009/0204899 A1 | 8/2009 | Bennett | |
| 2010/0070894 A1* | 3/2010 | Krishnamurthy | G06F 3/0481 |
| | | | 715/764 |
| 2010/0175001 A1* | 7/2010 | Lazarus | G06Q 10/109 |
| | | | 715/753 |
| 2010/0305814 A1* | 12/2010 | Ichikawa | G07C 5/085 |
| | | | 701/33.4 |
| 2011/0072372 A1* | 3/2011 | Fritzley | G06Q 10/109 |
| | | | 715/764 |
| 2011/0230790 A1* | 9/2011 | Kozlov | A61B 5/4812 |
| | | | 600/595 |
| 2011/0320981 A1* | 12/2011 | Shen | H04W 4/21 |
| | | | 715/834 |
| 2012/0047421 A1 | 2/2012 | Holman | |
| 2012/0079403 A1 | 3/2012 | Schorr et al. | |
| 2012/0090020 A1 | 4/2012 | Shrum, Jr. et al. | |
| 2012/0310376 A1* | 12/2012 | Krumm | G05B 15/02 |
| | | | 700/31 |
| 2013/0055106 A1* | 2/2013 | Tarneberg | G06Q 10/107 |
| | | | 715/753 |
| 2013/0073971 A1 | 3/2013 | Huang et al. | |
| 2013/0073972 A1 | 3/2013 | Yung et al. | |
| 2013/0073976 A1 | 3/2013 | McDonald et al. | |
| 2013/0170324 A1* | 7/2013 | Tu | G04G 21/08 |
| | | | 368/28 |
| 2013/0179272 A1* | 7/2013 | Bonev | G06Q 10/109 |
| | | | 705/14.66 |
| 2013/0203440 A1* | 8/2013 | Bilange | H04W 4/021 |
| | | | 455/456.2 |
| 2013/0205245 A1* | 8/2013 | Croll | G06Q 10/109 |
| | | | 715/781 |
| 2013/0290200 A1* | 10/2013 | Singhal | G06Q 30/018 |
| | | | 705/317 |
| 2014/0039842 A1* | 2/2014 | Yuen | A61B 5/6838 |
| | | | 702/189 |
| 2014/0052280 A1* | 2/2014 | Yuen | G06F 11/00 |
| | | | 700/91 |
| 2014/0052787 A1 | 2/2014 | Pigeon et al. | |
| 2014/0059487 A1* | 2/2014 | Baumann | G06F 3/0482 |
| | | | 715/811 |
| 2014/0082536 A1* | 3/2014 | Costa | G06F 3/0488 |
| | | | 715/765 |
| 2014/0191866 A1* | 7/2014 | Yuen | G01C 22/006 |
| | | | 340/539.13 |
| 2014/0200857 A1* | 7/2014 | Asada | A61B 5/1118 |
| | | | 702/189 |
| 2014/0282011 A1* | 9/2014 | Dellinger | G06F 3/0482 |
| | | | 715/731 |
| 2015/0019642 A1* | 1/2015 | Wang | H04L 67/306 |
| | | | 709/204 |
| 2015/0199616 A1* | 7/2015 | Rajendraprasad | G06N 99/005 |
| | | | 706/12 |
| 2015/0268839 A1* | 9/2015 | Tallett | H04L 65/403 |
| | | | 715/745 |
| 2016/0007912 A1* | 1/2016 | Hu | A61B 5/002 |
| | | | 600/595 |
| 2016/0027278 A1* | 1/2016 | Mcintosh | G08B 21/0423 |
| | | | 715/741 |
| 2016/0104119 A1* | 4/2016 | Von Hessberg | G06Q 10/109 |
| | | | 455/456.3 |
| 2016/0163311 A1* | 6/2016 | Crook | G10L 15/183 |
| | | | 704/275 |
| 2016/0183029 A1* | 6/2016 | Kang | G06Q 50/22 |
| | | | 455/41.2 |
| 2016/0249831 A1* | 9/2016 | Eastman | A61B 5/1118 |
| | | | 345/440 |
| 2017/0039428 A1* | 2/2017 | Kuwabara | G06K 9/00677 |
| 2017/0094046 A1* | 3/2017 | Raynnann | H04W 4/70 |
| 2017/0116552 A1* | 4/2017 | Deodhar | G06Q 10/06316 |
| 2018/0101142 A1* | 4/2018 | Dudhat | G04G 9/02 |

OTHER PUBLICATIONS

Engadget, "Nokia Drive Offline Navigation Review: Taking the Lumia 900 for an Off-the-Grid Spin," (2012). Retrieved from the Internet on May 24, 2013: URL:http://www.engadget.com/2012/08/01/nokia-drive-offline-navigation-review-taking-the-lumia-900-for/.
U.S. Appl. No. 13/843,790, filed Mar. 15, 2013.

* cited by examiner

PRESENTING USER ACTIVITY TIMELINE IN A COLLOQUIAL STYLE

FIELD OF TECHNOLOGY

The present disclosure relates to interactive digital maps and, more particularly, to providing an interface to a user for viewing his or her location history data in relation to a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, people use a variety of software applications and services that generate and store geo-located and time-stamped content. Some users, for example, record information regarding their past activities using applications that rely on check-ins or Global Positioning Service (GPS) or Wi-Fi positioning fixes. Examples of other applications that can generate geo-tagged and/or time-stamped content include calendar applications, email applications, photograph management applications, electronic ticket booking services, electronic restaurant reservation services, etc. Further, in some situations, users use multiple applications and services to transact business or create a personal record. For example, the user may make reservations for an event via email, confirm the reservations via a calendar appointment, and store photos of the event on an online photo storage service.

A time stamp in general specifies a date and time when a certain event or a position fix occurred. Accordingly, when a user wishes to view the history of her past activities, the date and time information conveys calendar data, such as Monday, March 3, 10:50 pm. However, descriptions of events in terms of calendar time are not always intuitive.

SUMMARY

To describe user's activities in terms of everyday language, a system identifies events that demarcate the user's days as the user likely perceives the demarcation. The system then presents to the user a description of her days in colloquial, rather than calendar, terms. A "colloquial day" at least partially overlaps the corresponding calendar day, but typically does not entirely overlap with the calendar day. For example, a colloquial Friday can include the entirety of a late-night event that ends on calendar Saturday, and accordingly the colloquial Friday can include more than 24 hours.

In an example embodiment, a method for generating a presentation of user activities occurring over a period of time includes (i) receiving, by one or more processors, location history data that indicates a plurality of locations the user visited and respective visit times, (ii) determining, by the one or more processors using the location history data, a continuous event that begins on a first calendar day and ends on a second calendar day, (iii) generating, by the one or more processors, a representation of the first calendar day as a colloquial day, wherein the colloquial day includes the entire event, and wherein the colloquial day at least partially overlaps with the calendar day but does no coincide with the calendar day, and (iv) displaying, by the one or more processors, the colloquial day via a user interface.

In another example embodiment, a method for generating a presentation of user activities occurring over a period of time includes (i) receiving, by one or more processors, location history data that indicates a plurality of locations the user visited and respective visit times; (ii) determining, by the one or more processors using the location history data, events that demarcate boundaries of a colloquial day that at least partially overlaps with a calendar day but does no coincide with the calendar day; and (iii) displaying, by the one or more processors, an interactive presentation of the colloquial day via a user interface, where the interactive presentation of the colloquial day includes indications of a plurality that occurred during the colloquial day.

In yet another embodiment, a system includes one or more processors and a non-transitory computer-readable medium storing instructions. The instructions, when executed on the one or more processors, cause the system to (i) receive location history data that indicates a plurality of locations the user visited and respective visit times, (ii) determine, using the location history data, a continuous event that begins on a first calendar day and ends on a second calendar day, (iii) generate a representation of the first calendar day as a colloquial day, wherein the colloquial day includes the entire event, and wherein the colloquial day at least partially overlaps with the first calendar day but does no coincide with the first calendar day, and (iv) display the colloquial day via a user interface.

DETAILED DESCRIPTION OF THE DRAWINGS

Overview

A software system presents to a user a visual and/or textual summary of her past activities in a "colloquial" terms rather than strict-calendar terms, so as to make the presentation more intuitive. For example, the system can describe the user's presence at a party between late evening and early morning of the next day as a single event overlapping the two calendar days, rather than distinct events occurring on two subsequent days. Further, the system can stretch out the representation of some days while compressing the representation of other days. Thus, for example, the system can generate a colloquial representation of the user's Saturday as a more-than-24-hour-long day, and the subsequent Sunday as a short day that includes less than 24 hours. Further, the system in some cases can identify multiple events that extend a day beyond the 24-hour period. To continue with the example above, the user may leave the party in the early morning of the next day and stop by at a restaurant before going home, and the system in this case may generate a colloquial representation of the user's day as including both the party and a visit to the restaurant.

To determine the boundaries for the days described colloquially ("colloquial days"), the system can identify places where the user can sleep ("sleepable places") using user's explicit indications (e.g., "this is where I live"), inferences (e.g., the centroid of the locations visited by the user), and locations of hotels, etc. As discussed in more detail below, the system can consider visits to sleepable places in view of certain time intervals, such as midnight to 6:00 am, for example. The system can determine when a certain colloquial day began and ended in view of an estimate of when the user woke up and went to sleep. In at least some of the implementations of the system, the user installs certain applications and/or operates certain controls on a location application, a web-based service, etc. to allow the system to utilize the user's data in this manner.

When the user views a timeline for events that occurred in different time zones, the system can adjust the start and end times of colloquial days in view of the time zone changes. For example, when the user flies from New York to California on a certain calendar day, the system can adjust the duration of the colloquial day to take into account the three-hour difference between these geographic regions.

In some implementations, the system also can use the user's home and work location as reference locations to identify trips of various duration within a set of events making up the user's location history. More particularly, the system can identify a one-day trip or cluster several consecutive days spent away from home to identify a longer trip. The system then can present an overview of the trip, present out-of-ordinary events as trip highlights, etc. Thus, for example, a timeline of activities for a user residing in San Francisco for the month of October can depict a three-day trip to Tokyo as a single event. The user in some cases additionally can view smaller events that make up the trip to Tokyo by operating appropriate controls.

Further, the system in some implementations can detect multiple visits to same locations, sort the visits by frequency, and present to a user a visual and/or textual summary of "top visited places." The system can break down the visits by seasons, months, etc. Further, the system can identify the regular places to improve suggestions. Still further, the system can aggregate information for multiple users to suggest a place the user has not yet visited (e.g., "Today is Saturday. You usually go out. Why not try______").

Still further, to make the summary of past activities more intuitive, the system in some implementations describes locations semantically (e.g., "Nick's Bar") rather than in terms of a street address or geographic coordinates. However, because the available techniques for determining semantic locations generally are unreliable, the system can determine the level of confidence in the identification of semantic location and assign one of the confidence levels to the semantic location: for example, the system can assign to the candidate semantic location (i) a high confidence score and simply include the semantic location in the timeline of a colloquial day, (ii) a medium confidence score and present the semantic location as part of the timeline with a UI element for confirming or rejecting the semantic location, or (iii) a low confidence score, provide the street address or a more general area (e.g., you are in Mission), and provide a UI element for specifying the semantic location. Depending on the level of precision, a semantic location is selected from within a place hierarchy, such as World 4 Country 4 State 4 County 4 City, etc. The system can utilize user's feedback when the confidence score is medium or low to improve future semantic location suggestions.

In another implementation, the system also improves the accuracy of geo-tagging photographs by identifying and eliminating potentially erroneous fixes, when a user collects multiple photographs at approximately the same location. More particularly, the system can organize the user's location history data into multiple segments, each having a centroid. In an example scenario, the user takes a photo with her smartphone at a certain location at a certain time, the system determines that the geo-tag is within a certain radius R (e.g., 1,000 m) of the centroid of the corresponding segment, and does not flag the photograph as probably having the wrong geo-tag. In another scenario, the user receives a geo-tagged and time-stamped photo from her friend via a chat application. The system determines that the geo-tag is outside the radius R (e.g., 1,000 m) of the centroid of the segment corresponding to the time-stamp of the photograph, and flags the photograph as probably having the wrong geo-tag. In this manner, the system can use location history of a user to improve time-specific geo-tagging of photographs.

Example System

Figure 1:
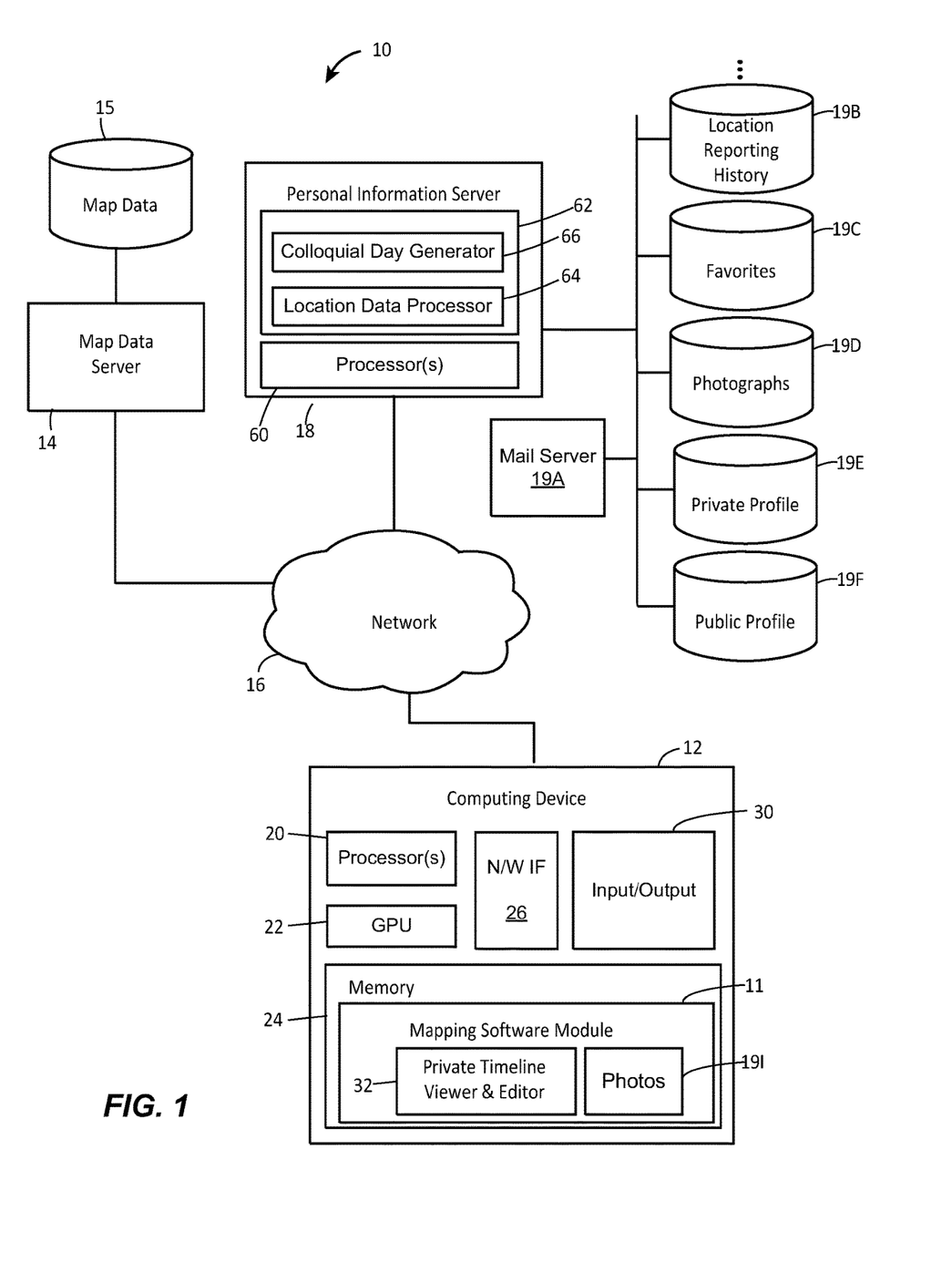
FIG. 1 is a block diagram of an example system in which techniques for presenting a private user location timeline in a colloquial style can be implemented.

FIG. 1 illustrates an example environment 10 in which a software system generates a colloquial representation of activities occurring during one or multiple days. More particularly, the software system can generate a private user location timeline that visually and/or textually describes colloquial, rather than calendar, days. The timeline generally provides a user with an overview of her location history as a sequence of geo-located events, such as visits to various places, the time and durations of these visits, intervals between geo-located events, etc. For simplicity, geo-located events are referred to below as simply "events." Depending on the implementation, the software system that generates the timeline can include a mapping software module 11 implemented in a user computing device 12 and/or software components implemented in a personal information server 18. More generally, the software system can include any suitable number of components implemented in a single computing device, or distributed over any suitable number of computing devices.

The software system can operate on location history data received from multiple applications or network services that provide such functionality as email, navigation, scheduling (e.g., calendar applications), online photograph management, location check-in, etc. In some embodiments, the user operates certain controls or installs certain applications to allow the software system to access this type of data. In any case, the software system can provide a single point of access to location history data collected from various sources and an intuitive interface for viewing and editing such data. Moreover, the software system can provide indications of the visited locations on a digital map.

The software system in general makes the private timeline inaccessible to other users, but the user can operate certain controls to share a portion or the entirety of his private timeline with another user or a group of users, in some embodiments.

In some implementation, the mapping software module 11 provides controls for expanding or collapsing sections of the timeline in accordance with user actions. For example, the mapping software module 11 initially display a timeline representing a compressed view listing location history data for a year without listing specific data about events during particular months. If the user wishes to view events that occurred during a specific month, week, day, etc., he may click or otherwise interact with the listing to specify that the timeline should now include events within the desired time period.

In some implementations of the software system, the mapping software module 11 provides an efficient user interface for editing entries for the selected events. For example, the mapping software module 11 can provide controls for adding notes, adding photographs, etc. The mapping software module 11 also may provide controls for editing the sources from which the mapping software module 11 obtains information. For example, the user may wish to prevent the mapping software module 11 from pulling information from her email account or from including information related to particular events or places in the timeline.

As illustrated in FIG. 1, the mapping software module 11 operates in the computing device 12 which can be, for example, a laptop computer, a tablet computer, a smartphone, etc. The computing device 12 is coupled to a map data server 14 and the personal information server 18 via a communication network 16, which may be a wide area network (WAN) such as the Internet, a local area network (LAN), or any other suitable type of network. In operation, the map data server 14 provides map data stored in a map database 15 to the mapping software module 11 in a vector graphics format or a raster image format, for example. The personal information server 18 receives and, in some cases, aggregates personal data for a user from various sources such as a mail server 19A storing user's messages, a location reporting history 19B storing user's check-in data or other reported location data, user's favorites database 19C storing indications of various user-selected locations, and user photograph database 19D storing photographs uploaded by the user. The personal information server 18 is also coupled to a private profile database 19E storing the user's private data as well as to a public profile database 19F storing the information the user chose to make public. Further, the personal information server 18 can be coupled to servers and/or database that provide information about the user's meal or event reservations (not shown), which may be made via reservation services or retrieved from the user email, for example, or flight booking information. Still further, the personal information server 18 can receive navigation information, such as requests for navigation directions, from a navigation information server (not shown). More generally, the personal information server 18 can receive data from any number of sources operating in a same network, or multiple networks. Moreover, the personal information server 18 and/or the mapping software module 11 can also use data stored locally, including for example on-device photographs 191.

In the example implementation of FIG. 1, the client device 12 includes a Central Processing Unit (CPU) or any suitable one or more processors 20, a graphics processing unit (GPU) 22, a computer-readable memory 24, a network interface 26, and a user interface 30 that may include a display device and one or more input devices. The memory 24 is computer-readable non-transitory storage device that may include both persistent (e.g., a hard disk) and non-persistent (e.g., RAM) memory components. The memory 24 stores instructions executable on the processor(s) 20 and/or the GPU 22, including the mapping software module 11.

The mapping software module 11 includes a private timeline viewer and editor 32 that provides various functionality related to an interactive user location timeline. In one implementation, the private timeline viewer/editor 32 operates as a component in a private profile viewer module (not shown) that allows the user to access his private profile data.

Depending on the implementation, the mapping software module 11 operates as a separately executable software application (a "mapping application"), a plugin that extends the functionality of another software application such as a web browser, an application programming interface (API) invokable by a software application, etc. The instructions that make up the mapping software module 11 may be compiled and executable on the processor(s) 20 and/or the GPU 22 directly, or not compiled and interpreted by the CPU 20 at runtime. Further, the private timeline viewer/editor 32 may be provided as an integral part of the mapping software module 11 or as a separately installable and downloadable component.

In an example scenario, the user at some point operates appropriate controls (which may be provided by the mapping software module 11) to allow the personal information server 18 to use one or more of the data from the sources 19A-F when generating location history data, which in turn is used to construct an interactive location history timeline. Subsequently to configuring the personal information server 18, the user may operate appropriate controls provided by the mapping software module 11 when she wishes to view her private location timeline. The computing device 12 then may request map data from the map data server 14 and the personal information server 18 as necessary to generate a new timeline or update a previously generated timeline. In the examples illustrated in this disclosure, the computing device 12 generates the timeline using location history data received from the personal information server 18. In other implementations, however, the timeline is generated at the personal information server 18 or another network device.

For simplicity, FIG. 1 illustrates the map data server 14 and the personal information server 18 as single instances of a server device. However, the map server 14 and/or the personal information server 18 according to some implementations include a group of one or more map server devices, each equipped with one or more processors and capable of operating independently of the other map server devices. The map data server 14 and/or personal information server 18 operating in such a group can process requests from the client device 12 individually (e.g., based on availability), in a distributed manner where one operation associated with processing a request is performed on one map server and/or personal server device while another operation associated with processing the same request is performed on another map server and/or personal server device, or according to any other suitable technique. For the purposes of this discussion, the term "map data server" may refer to an individual map server device or to a group of two or more map data server devices and the term "personal information server" may refer to an individual personal information server device or to a group of two or more personal information server devices.

With continued reference to FIG. 1, the personal information server 18 may include one or more processors 60 and a computer-readable memory 62 that stores a location data processor 64 and a colloquial day generator 66, made up of instructions executable on the processor(s) 60. The colloquial day generator 66 in other embodiments can be implemented, partially or fully, in the computing device 12. In operation, the colloquial day generator 66 generates, for a certain user, a representation of her activities in a colloquial style, to be displayed as part of a private location history timeline or as part of any other suitable representation (e.g., in an informational card listing events that occurred on a user-specified day).

An example location timeline the colloquial day generator 66 can generate is discussed next.

Example Private Location Timeline Provided in a Colloquial Style

Figure 2A:
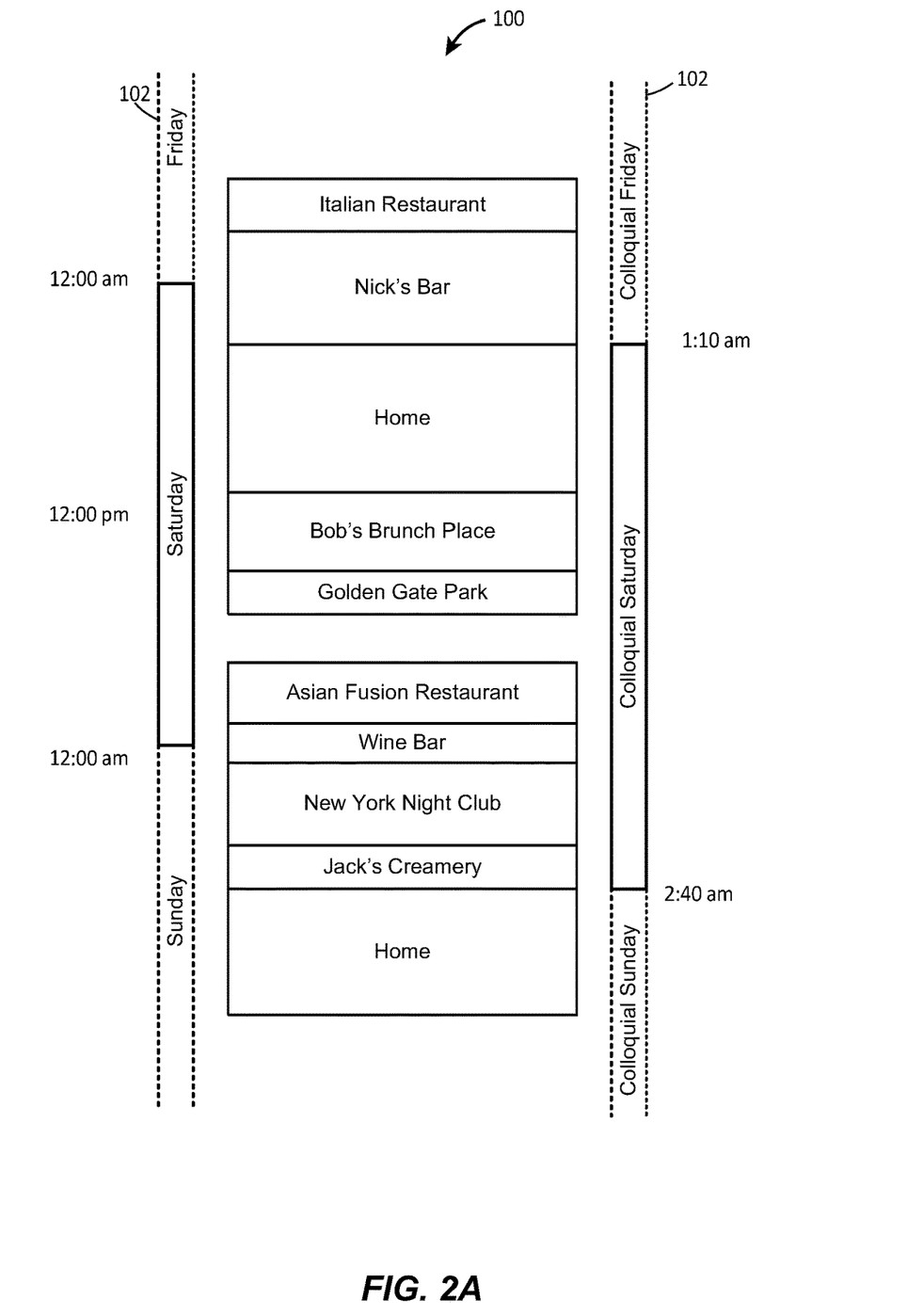
FIG. 2A schematically illustrates an example colloquial style timeline, which the system of FIG. 1 can generate.

Referring to FIG. 2A, a timeline 100 includes a calendar timeline 102, in which days begin and end at midnight, and a colloquial timeline 102, in which days do not necessarily begin or end at midnight. It will be understood that the colloquial day generator 66 need not display timelines 102 and 104 to the user in every scenario, and that the timelines 102 and 104 are illustrated in FIG. 2A for clarity.

According to the timeline 100, the user went to Nick's Bar late on Friday night, and did not leave until sometime after midnight. Thus, according to the calendar representation of Friday and Saturday, the user spent some time at Nick's Bar on Friday, and then spent some time at Nick's Bar on Saturday. If the user were to request a listing of her activities for Friday, and then a listing of her activities for Saturday, in a calendar format, the personal information server 18 would report that the user visited Nick's Bar on Friday, and then again on Saturday. However, this description may not make sense to the user because, if she were to describe her weekend to somebody, she would probably say "I went to Nick's Bar on Friday and got home late (and I didn't go back to Nick's Bar on Saturday)."

Thus, as illustrated in FIG. 2A, the colloquial day generator 66 extends the colloquial Friday to include the entire visit to Nick's Bar. As a result, the user's colloquial Friday may include more than 24 hours. As another consequence, the user's colloquial Saturday can begin later in the morning, when the user gets home, rather than at 12:00 am. Similarly, the user's colloquial Saturday may not end until 2:40 am, when she gets home from Jack's Creamery.

More generally, the colloquial day generator 66 can generate timelines spanning multiple days or descriptions of particular days upon request. For example, the colloquial day generator 66 can provide the timeline 100 via a user interface in an interactive format, so that the user can "zoom in" on a certain period of time to view more minor events, or "zoom out" to see only more important events that occurred over the past month, for example. In another scenario, the user can select a certain calendar day, and in response the colloquial day generator 66 can provide a timeline for the corresponding day in the colloquial style illustrated in FIG. 2A. The colloquial day in this scenario can coincide with the calendar day completely or only partially.

Further, the colloquial day generator 66 can generate descriptions of colloquial days not only for past events but also for planned future events. For example, if the user is planning to take a late-night flight that arrives at the destination early in the morning the next day, the colloquial day generator 66 can generate a colloquial representation of the day of the departure that includes the entire flight.

After the colloquial day generator 66 groups together events that make up colloquial days and, in some cases, groups together colloquial days that make up multi-day trips or other multi-day activities, the colloquial day generator 66 can generate a visualization of the timeline. As one example illustrated in FIG. 2B, the colloquial day generator 66 can provide a vertically scrollable timeline 130 that illustrates a sequence of geo-located events in reverse chronological order.

Figure 2B:
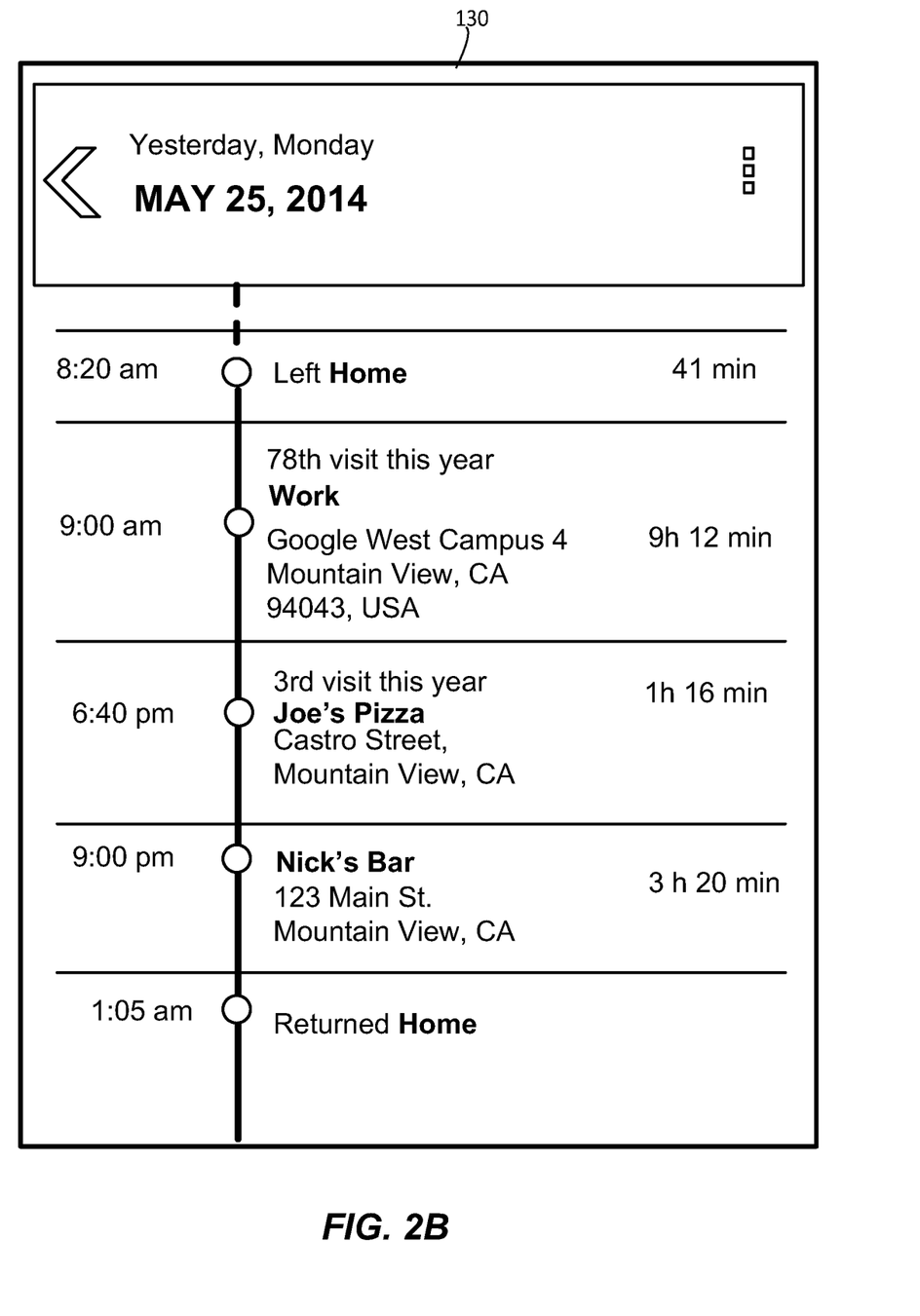
FIG. 2B illustrates an example visualization of a colloquial style timeline, which the system of FIG. 1 can provide via a display of a user device.

Each entry in the timeline 130 corresponds to a respective geo-located event. More particularly, an entry of the timeline 130 can include a description of the location (which the user can customize, in at least some of the embodiments), the address (when available), a visit counter, etc. Further, an entry can include indications of time and indications of duration for the corresponding geo-located event. For some entries, additional details such as notes, photographs, links, etc. can be accessed using controls such as buttons or interactive icons, for example. In addition to displaying geo-located events, the timeline 130 also can display user's activities occurring at changing locations, such as commute or other types of travel. As a more specific example, the user's commute to a location (e.g., her commute from home to work) may be displayed on the timeline, along with the duration of the commute, the route the user took, and the user's mode of transportation. Even if the colloquial day generator 66 cannot collect specific geo-location information about a user's travel activity, the travel may be inferred, for example, based on navigational searches that a user had performed.

Depending on the scale, the timeline 130 can include "collapsed" sections representing long periods of time, such as weeks or months. The user can click or tap on these second to request that the corresponding entries be displayed.

According to some implementations, the events on the timeline 130 include indications of the corresponding locations on a digital map. As one example, the map may occupy a portion of the screen and include markers corresponding to different events. More particularly, as the user scrolls through events, a marker corresponding to the location of the currently selected geo-located event can "jump" to the appropriate location on the digital map. If necessary, the map can pan to the appropriate location. As another example, some or all of the entries may include links that, when activated, trigger a display of a digital map centered at the location of the geo-located event. As yet another example, some or all of the entries may include "mini-map" views with the location of the geo-located events displayed as markers, for example.

Example Technique for Generating Colloquial Day Representations

Figure 3A:
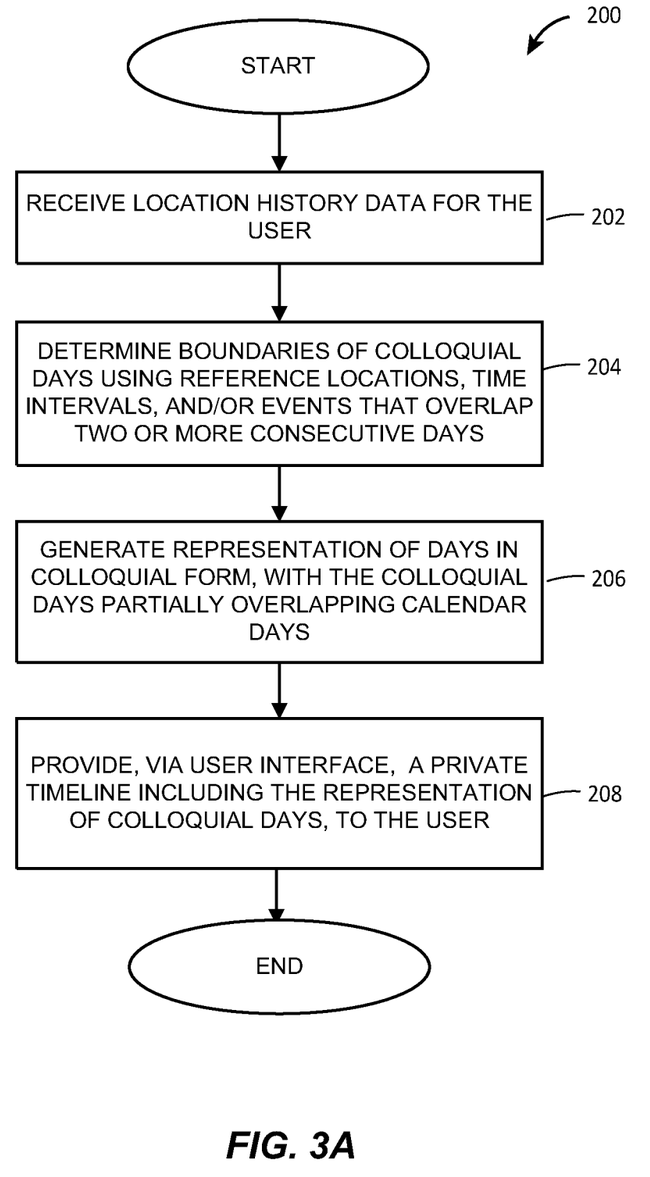
FIG. 3A is a flow diagram of an example method for generating a user location timeline in a colloquial style, which can be implemented in the system of FIG. 1.

An example method for generating a colloquial timeline, such as the timeline of FIG. 2A, is discussed next with reference to FIG. 3A. The method 200 can be implemented as instructions stored on a computer-readable medium and executed on one or more processors, in one or several client device(s) and/or network device(s). For example, referring back to FIG. 1, the method 200 in one embodiment is implemented in the mapping software module 11. In another embodiment, the method 200 is implemented in the personal information server 18 or another network device. In yet another embodiment, the method 200 is implemented partially in the computing device 12, and partially in the personal information server 18.

The method 200 begins at block 202, location history data is received from one or more sources. In an example implementation, the received location history data is collected from multiple sources of the user's personal data at a network server. The location history can be a data structure that includes multiple entries, each including one or more of (i) an indication of time, (ii) an indication of duration, (iii) GPS coordinates, a street address, or any other indication of location, (iv) one or more photographs, (iv) links to the sources of the data, etc.

Next, at block 204, boundaries between colloquial days are determined. Depending on the scenario, a colloquial day can be demarcated by the user arriving at, or departing from, a sleepable place, and/or identifying an event that overlaps two or more calendar days. Generally speaking, according to the method 200, an attempt is made to identify a continuous qualifying event that overlaps two or more days. An example method for determining one or both boundaries of a colloquial day is discussed below with reference to FIG. 3B. In an example scenario, a certain colloquial day is determined to start at 6:00 am and end at 2:00 am the next calendar day. The steps associated with block 204 can be repeated as many times as necessary to determine the boundaries of one or several (e.g., three, five, 25) colloquial days.

At block 206, a representation of one or more colloquial days is generated using the boundaries determined at block 204. More particularly, various events can be mapped to respective colloquial days, without breaking up the events which the user is likely as being whole (see FIG. 2A). The representation of the one or more colloquial days is then provided to the user via a user interface, at block 208.

Figure 3B:
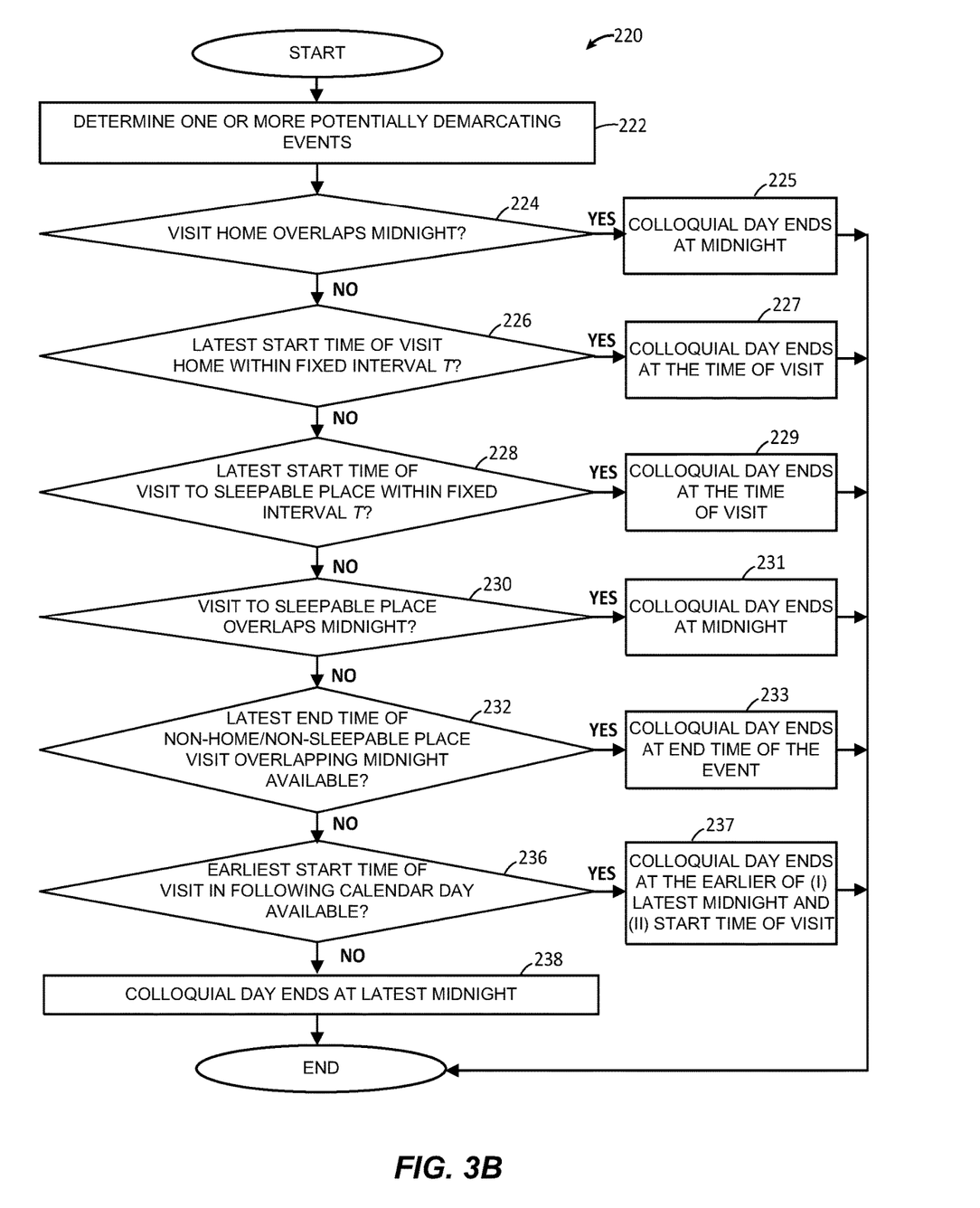
FIG. 3B is a flow diagram of an example method for determining boundaries between colloquial days, which can be implemented in the system of FIG. 1.

Now referring to FIG. 3B, similar to the method 200, a method 220 for determining boundaries of colloquial days can be implemented as instructions stored on a computer-readable medium and executed on one or more processors.

The method 220 begins at block 222, where the following factors are determined, when available: (i) the latest start time of any visit home between $t_1$ and $t_2$ on the following calendar day, where $t_1$ and $t_2$ can be assigned respective values of 12:00 am and 6:00 am, in an example implementation; (ii) the earliest start time of any visit to a sleepable place between $t_1$ and $t_2$ on the following calendar day, where the sleepable place is the hotel, for example; (iii) (iii) the latest end time of any non-home/non-sleepable place visit overlapping the midnight between the current and the following calendar days, (iv) the time of the latest midnight overlapped by a visit to either the user's home or another a sleepable place, (v) the earliest start time of any visit that occurred on the following calendar day, and (vi) the time of the latest midnight of any of the visited time zones on this calendar day. Further, at block 222, it can be determined whether a visit home or a visit to a sleepable place overlaps the midnight between the day and the following day.

The flow first proceeds to block 224 to determine whether the latest visit home overlaps the midnight between the current calendar day and the next calendar day. If this condition is satisfied, the flow proceeds to block 225, where the end of the current colloquial day is set to be the midnight between the current calendar day and the next calendar day. Otherwise, the flow proceeds to block 226.

At block 226, it is determined whether latest start time of any visit to a sleepable place is within a certain interval T, such as between 12:00 am and 6:00 am on the next day. If the latest start time of a visit falls within this interval, the end of the current colloquial day is set to be the start time of this visit at block 227.

Otherwise, at block 228, the latest start time of any visit to a sleepable place is compared to the interval T and, if the latest start time falls within the interval T, the end of the current colloquial day is set to be the start time of this visit, at block 229. If the latest start time of the visit is unavailable or falls outside the interval T, the flow advances to block 230.

At block 230, the system executing the method 220 determines whether the visit to a sleepable place overlaps the midnight between the current calendar day and the next calendar day. If the visit overlaps the midnight, the end of the current colloquial day is set to be the midnight between the current calendar day and the next calendar day, at block 231. Otherwise, the flow proceeds to block 232.

If is determined that the latest end time of any non-home/non-sleepable place visit overlaps the midnight between the current calendar day and the next calendar day, the flow proceeds to block 233, where the latest end time of this visit is used to demarcate the end of the colloquial day. Otherwise, the flow proceeds to block 236.

If it is determined, at block 236, that the earliest start time of any visit that occurred in the following calendar is available, this time is used to demarcate the end of the colloquial day at block 237. Otherwise, the of the current colloquial day is set to be the time of the latest midnight of any of the visited time zones on this calendar day, as determined at block 222.

Additional Techniques that can be Implemented in the System of FIG. 1

Figure 4:
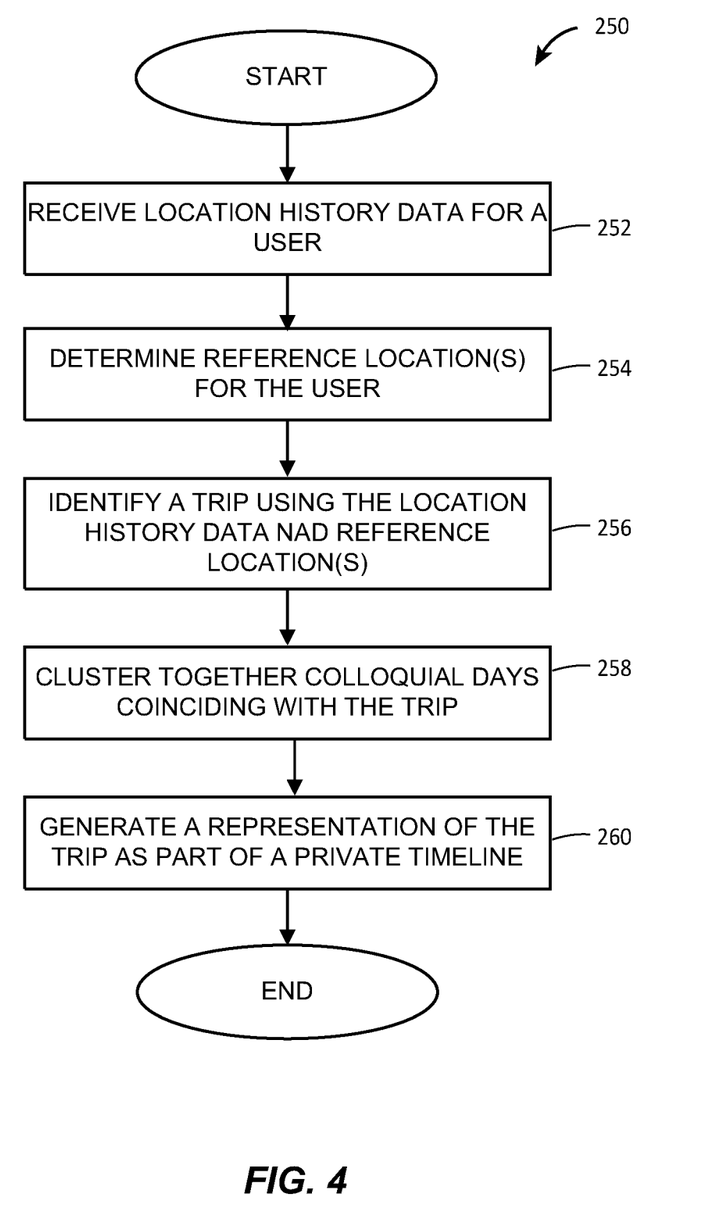
FIG. 4 is a flow diagram of an example method for generating a representation of multi-day trips using location history data, which also can be implemented in the system of FIG. 1.

FIG. 4 is a flow diagram of an example method 250 or generating a representation of multi-day trips using location history data, which also can be implemented in the system of FIG. 1. At block 252, location history data is received for a user. Reference locations, such as the user's home, place of work, etc., are determined at block 254. The user can specify these locations explicitly by operating appropriate controls on a digital map, for example.

At block 256, a trip of is identified by detecting events in the user's location history data that occur far from the reference of locations, over an extended period of time. For example, if the user lives in San Francisco and works in Mountain View, Calif., the user's visit to Lake Tahoe may trigger the determination that the user is travelling because of the distance between the user's home, her place of work, and the place being visited.

At block 258, several colloquial days (or calendar days, in some implementations), are clustered together. For example, if the user leaves his home in San Francisco, spends four days in Seattle, and returns home, the four days spent away from home can be clustered together to define a single trip. A representation of the trip can be provided on a private location timeline or as part of another presentation at block 260. The user thus can view and examine the entire trip as a single event associated with a visit to Seattle rather than as multiple visits to places in Seattle. If the user visits multiple locations during a trip, locations at which the user spent more time can be identified and displayed to the user as trip highlights.

Figure 5:
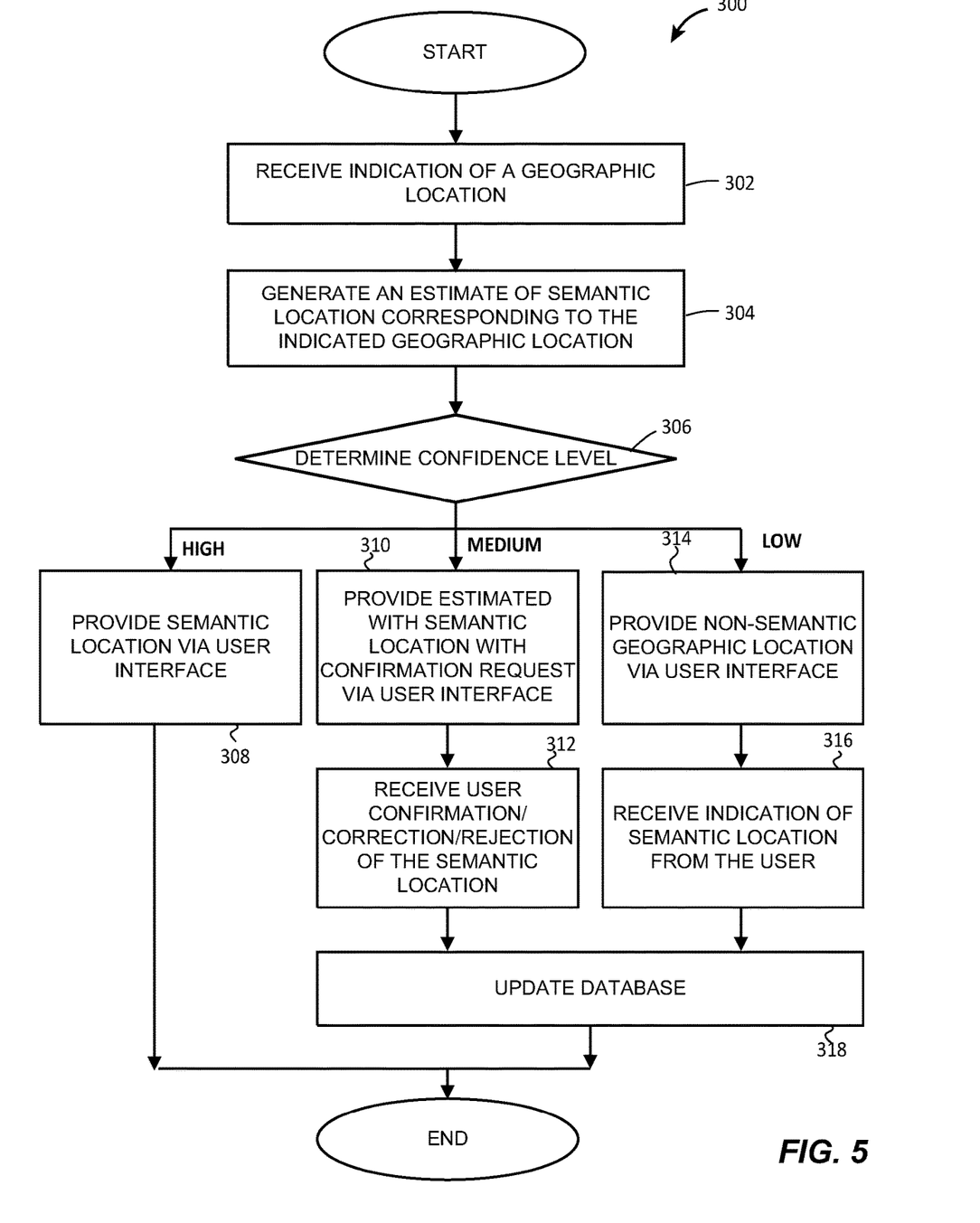
FIG. 5 is a flow diagram of an example method for generating a semantic representation for use with a location history timeline, which also can be implemented in the system of FIG. 1.

FIG. 5 is a flow diagram of an example method 300 for generating a semantic representation for use with a location history timeline, which also can be implemented in the system of FIG. 1. The method 300 begins at block 302, at which an indication of a geographic location is received in a non-semantic format, e.g., as a set of GPS coordinates.

Next, at block 304, an estimate of a semantic location corresponding to the specified non-semantic location is generated. A semantic location can be, for example, the name of the business (e.g., "Zanies Comedy Club"). The level of confidence of the semantic location is determined at block 306. To this end, the system of FIG. 1 can consider, for example, the level of precision of the GPS fix or the Wi-Fi fix, the number of times similar coordinates were mapped to the semantic location, the popularity of the semantic location, etc. An indication of the level of confidence can be provided to the user in the form of an appropriate icon, for example.

If the confidence level is high, the semantic location simply can be provided to the user via the user interface as part of a private location timeline, for example (block 308). However, if the confidence level is medium, the semantic location can be provided along with a suggestion to confirm or reject the semantic location (block 310). After the user confirms or rejects the location at block 312, the database of semantic locations can be updated at block 318. If the confidence is low, the non-semantic location is provided at block 314, and the user is prompted for a semantic location at block 316. The database of semantic locations can be updated at block 318, if the user has provided input.

Figure 6:
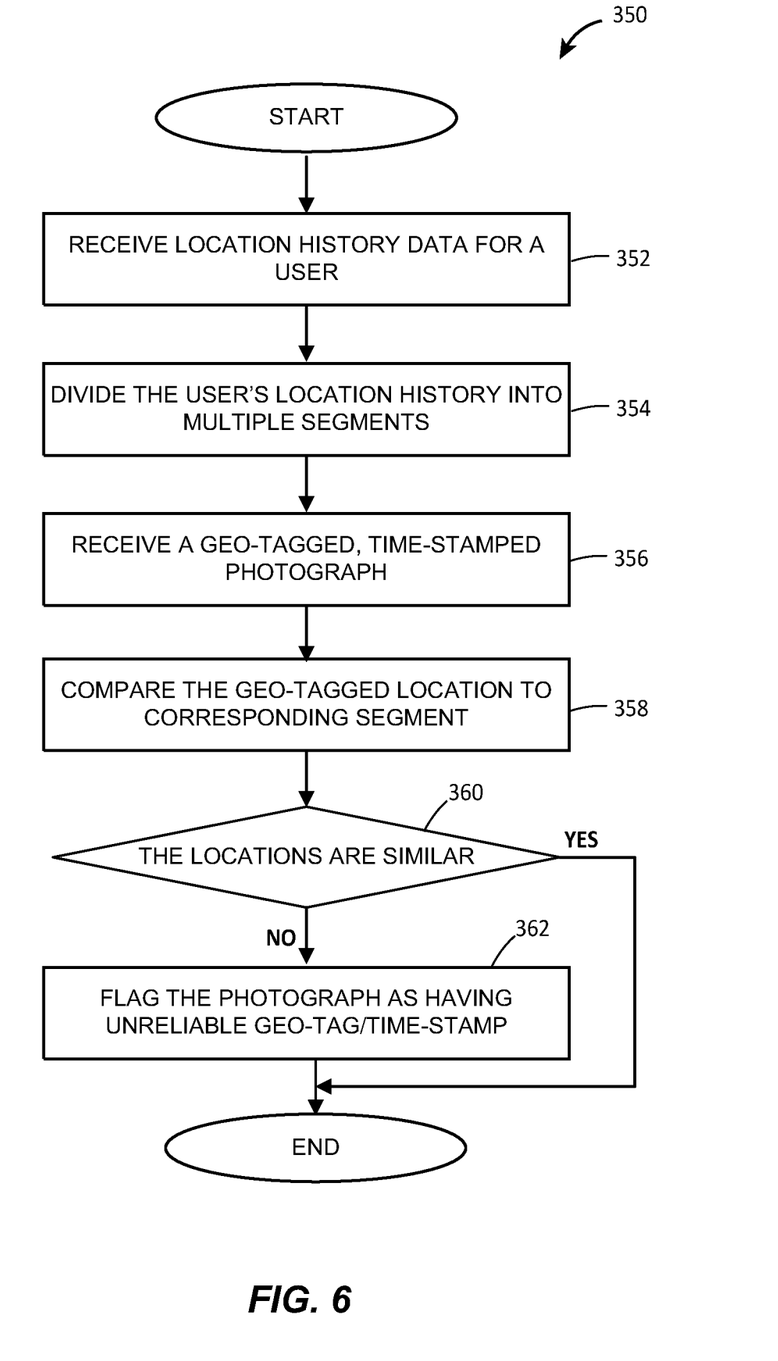
FIG. 6 is a flow diagram of an example method for identifying photographs with geo tags and/or time stamps that are probably unreliable, which also can be implemented in the system of FIG. 1.

FIG. 6 is a flow diagram of an example method 350 for identifying photographs with geo tags and/or time stamps that are probably unreliable, which also can be implemented in the system of FIG. 1. The method 350 begins at block 352, where location history data for a user is received for a user. The user's location history data can be divided into multiple segments at block 354, and a centroid for each segment can be determined.

Next, at block 358, a geo-tagged, time-stamped photograph is received. Using the location history data received at block 352, the user's approximate location at the time corresponding to the geo-tag of the photograph is determined. For example, the photograph can have a geo-tag corresponding to location $l_1$ and time $t_1$. The user's location history can indicate that he was at location $l'_1$ and time $t'_1 \approx t_1$.

The location reported in the location history is then compared to the location corresponding to the geo-tag of the photograph at block 358. In an example implementation, the locations are compared to determine whether the locations are within 1,000 meters of each other. If, at block 360, it is determined that the locations $l_1$ and $l'_1$ are not sufficiently similar, the photograph can be flagged as being probably unreliable at block 362.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described in the present disclosure as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described in the present disclosure.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described in the present disclosure. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described in the present disclosure may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to in the present disclosure may, in some example embodiments, comprise processor-implemented modules.

Similarly, the methods or routines described in the present disclosure may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used in the present disclosure, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments in the present disclosure. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for generating an interactive private user location timeline through the disclosed principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method for generating an interactive presentation of user activities occurring over a period of time, the method comprising:
   receiving, by one or more processors, location history data that indicates a plurality of locations the user visited and respective visit times;
   receiving, via a user interface, a selection of a first calendar day;
   in response to the selection, determining, by the one or more processors using the location history data, a continuous event that begins on the first calendar day and ends on a second calendar day;

generating, by the one or more processors, a representation of the first calendar day as a first colloquial day and the second calendar day as a second colloquial day, wherein the first colloquial day includes a plurality of events and ends with the entire continuous event, and the second colloquial day begins after the continuous event, wherein the first colloquial day at least partially overlaps with the first calendar day but does not coincide with the first calendar day; and displaying, by the one or more processors, the first colloquial day via the user interface, including providing an interactive timeline in which the events are individually selectable to view and/or edit event information.

2. The method of claim 1, further comprising:
determining, by the one or more processors, a first time when the user woke up;
determining, by the one or more processors, a second time when the user went to sleep; and
determining, by the one or more processors, when the first colloquial day begins and ends using the first time and the second time.

3. The method of claim 2, further comprising:
identifying, by the one or more processors, one or more places at which the user can sleep;
wherein determining when the first colloquial day begins and ends includes further using the identified one or more places at which the user can sleep.

4. The method of claim 3, wherein identifying the one or more places at which the user can sleep includes determining, by the one or more processors, one or more of (i) a location of a user home or (ii) a location of a business that offers overnight accommodation.

5. The method of claim 2, wherein a length of the first colloquial day does not correspond to a length of a calendar day.

6. The method of claim 1, generating, the representation of the first calendar day includes determining, for at least one of the locations the user visited, a semantic representation of the location, wherein the semantic representation includes a name of a business.

7. The method of claim 1, further comprising:
determining, by the one or more processors, when the first colloquial day ends using a latest start time of any visits to a place where the user can sleep, including:
determining whether the latest start time is within a predetermined interval of time, and
if the latest start time is within the predetermined interval of time, setting a time when the first colloquial day ends to the latest start time.

8. The method of claim 1, wherein generating the representation of the first calendar day as the first colloquial day includes:
determining, by the one or more processors, a time zone in which the user was located during at least a portion of the first calendar day; and
adjusting, by the one or more processors, a time when the first colloquial day begins in view of the determined time zone.

9. The method of claim 1, wherein the user interface includes a screen, the method further comprising:
displaying a digital map in a first portion of a screen;
in response to a user scrolling through the events on the interactive timeline, moving a marker corresponding to a location of the current selected event to an appropriate location on the digital map.

10. A method for generating a presentation of user activities occurring over a period of time, the method comprising:
receiving, by one or more processors, location history data that indicates a plurality of locations the user visited and respective visit times;
receiving, via a user interface, a selection of a calendar day;
in response to the selection, determining, by the one or more processors using the location history data, events that demarcate boundaries of a colloquial day that at least partially overlaps with the calendar day but does not coincide with the calendar day, each of the determined events associated with only one colloquial day; and
displaying, by the one or more processors, an interactive presentation of the colloquial day via a user interface, wherein the interactive presentation of the colloquial day includes indications of a plurality of events that occurred during the colloquial day, wherein the indications are individually selectable to view and/or edit event information.

11. The method of claim 10, wherein determining the events that demarcate the boundaries of the colloquial day includes identifying a place the user likely slept and determining whether the user visited the place within a predetermined period of time.

12. The method of claim 10, wherein determining the events that demarcate the boundaries of the colloquial day includes:
identifying a continuous event that begins on a first calendar day and ends on a second calendar day, and
associating an entirety of the continuous event with the first calendar day without associating any portion of the continuous event with the second calendar day.

13. A system comprising:
one or more processors;
a user interface;
a non-transitory computer-readable medium storing thereon instructions which, when executed on the one or more processors, cause the system to:
receive location history data that indicates a plurality of locations the user visited and respective visit times,
receive, via the user interface, a selection of a first calendar day,
in response to the selection, determine, using the location history data, a continuous event that begins on the first calendar day and ends on a second calendar day,
generate a representation of the first calendar day as a first colloquial day and the second calendar day as a second colloquial day, wherein the first colloquial day includes a plurality of events including the entire continuous event and the second colloquial day excludes the continuous event, and wherein the first colloquial day at least partially overlaps with the first calendar day but does not coincide with the first calendar day, and
display the first colloquial day via the user interface, including provide an interactive timeline in which the events are individually selectable to view and/or edit event information.

14. The system of claim 13, wherein the instructions further cause the system to:
determine a first time when the user woke up;
determine a second time when the user went to sleep; and
determine when the colloquial day begins and ends using the first time and the second time.

15. The system of claim 14, wherein the instructions further cause the system to:

identify one or more places at which the user can sleep;
wherein determining when the first colloquial day begins and ends includes further using the identified one or more places at which the user can sleep.

16. The system of claim 14, wherein a length of the first colloquial day does not correspond to a length of a calendar day.

17. The system of claim 13, wherein to generate the representation of the first calendar day, the instructions cause the system to determine, for at least one of the locations the user visited, a semantic representation of the location, wherein the semantic representation includes a name of a business.

18. The system of claim 13, wherein the instructions cause the system to determine when the first colloquial day ends using a latest start time of any visits to a place where the user can sleep, including determine whether the latest start time is within a predetermined interval of time, and
if the latest start time is within the predetermined interval of time, set a time when first colloquial day ends to the latest start time.

19. The system of claim 13, wherein to generate the representation of the first calendar day as the first colloquial day, the instructions cause the system to:
determine a time zone in which the user was located during at least a portion of the first calendar day; and
adjust a time when the first colloquial day begins in view of the determined time zone.

* * * * *